2,868,685

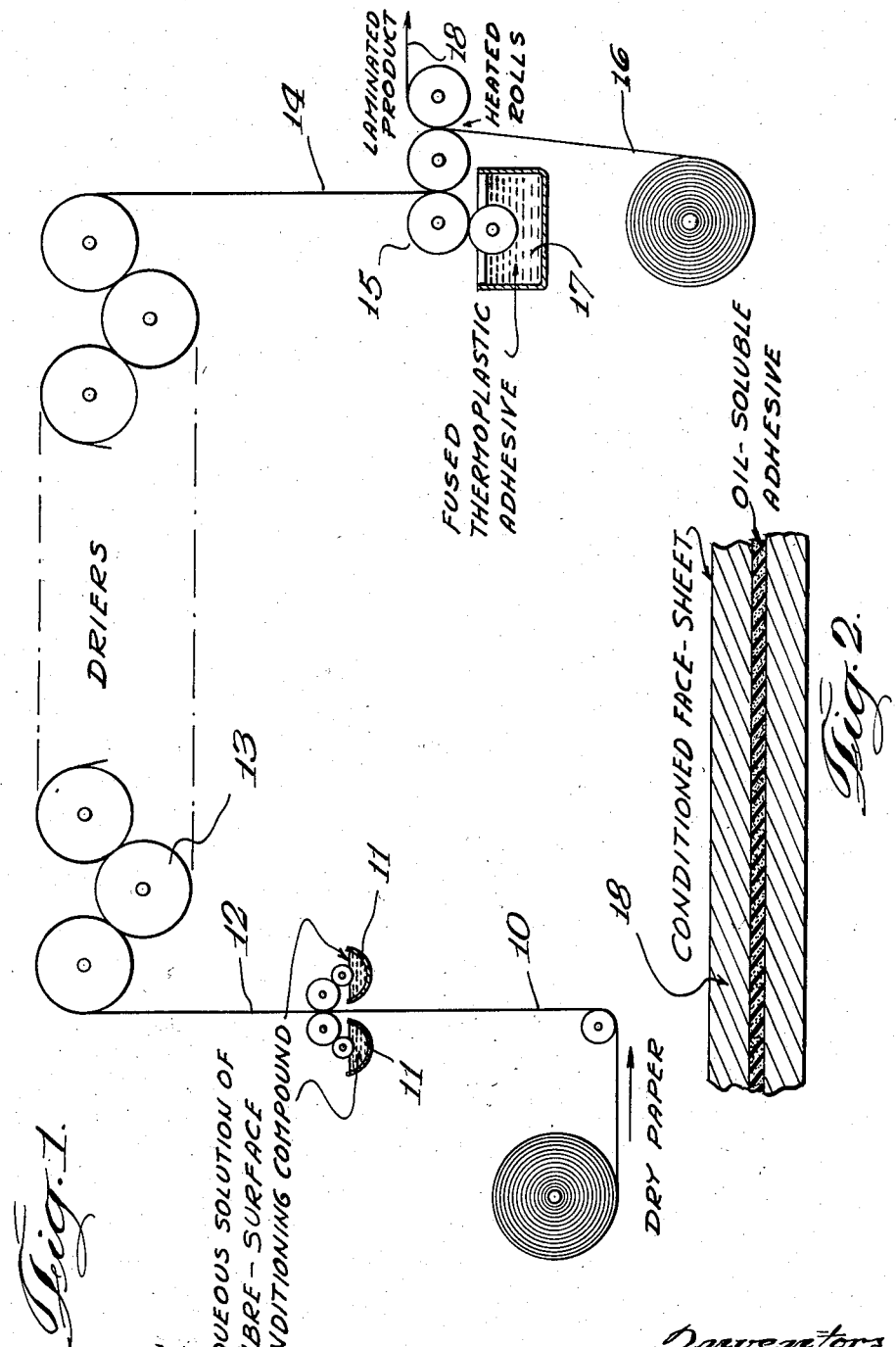

PAPER AND METHOD OF MAKING SAME

Martin L. Downs, Appleton, and Milton G. Schmitt, Kaukauna, Wis., assignors to Thilmany Pulp & Paper Company, Kaukauna, Wis., a corporation of Wisconsin Application July 26, 1954, Serial No. 445,596

6 Claims. (Cl. 154—138)

The invention has to do with the manufacture of oil-resistant and water-resistant papers. It is of particular value in the manufacture of laminated paper, a term used generally to mean a composite paper sheet composed of two or more separately made sheets of paper united together by an adhesive material so as to form a unitary sheet.

Common types of such laminated paper products include composite sheets in which the separate plies of paper are united together by thermoplastic material, for example asphalt or microcrystalline wax, both of which materials are solid at normal atmospheric temperatures. These materials may be fused and made quite fluent at temperatures which are substantially above normal atmospheric temperatures, but are below that which would injuriously overheat the fibers of the paper.

For many years one difficulty with oil-resistant, water-resistant laminated papers of the character described has been the fact that the thermoplastic material, which is coated onto the paper or disposed between the plies, has had a tendency to bleed through the sheet and thereby cause an objectionable appearance. This bleeding problem has been particularly acute in certain laminating procedures which include heating during the laminating operation. This problem also arose when the laminated product or coated paper is subjected to excessive temperature over a long period of time.

Attempts have been made to overcome this bleeding difficulty by employing a different procedure or technique in the preparation of the papermaking stock prior to the web-forming operation, as for example, at the beater. However, although some measure of success has been obtained in this way in respect of the bleeding difficulty, such treatments generally have injuriously affected the strength or flexibility of the final product.

Other attempts have been made by sizing the sheets after web formation. However, when the necessary amounts of sizing were added to prevent bleeding, the sheet lost its porosity, and its strength and flexibility were impaired.

In the manufacture of these oil-resistant, water-resistant and laminated papers, i. e. plastic coated and laminated paper products, the sheet should be porous so that it can release entrapped moisture and air. Such porosity is assured by the use of long fibers in the sheet, which type of fibers also provide strength and tear resistance. It will be seen that such long-fibered sheets would readily permit bleeding.

We have discovered that the bleeding difficulty can be overcome and the porosity maintained by giving the fibers a special treatment. More particularly, we have discovered that the fibers should be treated in such a way, and the thermoplastic should be selected so that the contact angle of the thermoplastic with the paper made from the fibers does not substantially change in a specified period of time. Of course, the treatment should not substantially interfere with the porosity of the sheet. If this contact angle is substantially retained, bleeding, which is occasionally referred to as "strike through," does not occur in an objectionable amount. Furthermore, in addition to overcoming the "strike through" problem, the discovery can be made to produce a finished product which in various other respects is more commercially desirable than any laminated paper of the type described heretofore produced.

In general, it has been discovered that the improved result can be obtained by treating the fibers of at least one of the sheets of the laminated product, preferably the outer or face sheet or ply, prior to laminating, with a conditioning material which, as a result of the treatment, has the effect of so modifying the ply or sheet that the contact angle with respect to certain thermoplastics exceeds 60° and does not substantially change. The conditioning material should be applied in such low amounts that the size of the pores in the sheet is not materially reduced and the flexibility of the sheet is maintained. The resultant sheet is rendered not only more hydrophobic or water resistant and, consequently, weatherproof, but is sufficiently oleophobic to prevent the thermoplastic adhesive from penetrating far enough into the body of the sheet to cause any significant "strike through" effect, while still preserving a satisfactory adhesive bond between the plies of the composite sheet.

In measuring angle of contact, a modified standard Tappi method was employed, this method being designated T458–M–48 (A. S. T. M. D–724). The method is as follows: A ball of wax or asphalt weighing 5 mg. is placed on the surface of the sheet to be tested. This sheet is then placed in a constant temperature oven for the specified time at 220° F., removed and cooled. The temperature is well above the melting point of the laminating wax used (165° F.) or the ring and ball softening point of the asphalt (165° F.). Contact angles were measured on the solidified droplets by the standard method.

It has been found that this contact angle should not change more than 20° in the time between 2 minutes in the oven and 10 minutes in the oven if bleeding is to be prevented.

The weight of the paper, which is related to the porosity, is a factor in preventing bleeding. In this connection, the paper weight should be heavy enough so that the contact angle is maintained as described.

Thus, it has been discovered that a satisfactory sheet for laminating and for use as water and oil resistant paper can be prepared by adjusting the weight of the sheet, selecting the type of thermoplastic employed, and utilizing a conditioning agent, which will substantially maintain the contact angle, in such small amount that the porosity of the sheet is not substantially impaired.

We have discovered that satisfactory application of the conditioning material can be effected by treating a sheet (after drying but before laminating) with a relatively dilute aqueous solution (or dispersion) of the agent which, when the water of the solution is subsequently dried or evaporated by heat, will be polymerized or otherwise converted into a compounds which conditions the sheet in accordance with the invention. Sufficient volume of the treating liquid is employed to penetrate into the body of the sheet a substantial distance, or in certain cases in sufficient volume to impregnate the entire body of the sheet. However, the concentration of the conditioning agent carried by the aqueous liquid is so low that after the subsequent drying operation it does not fill the pores of the sheet but is distributed over the surfaces of the individual fibers, perhaps in the form of an attenuated layer of the compound.

Among the conditioning agents which may be dissolved or dispersed in the solution for obtaining these improved results, are those which include compounds containing chromium or other metals capable of forming complexes with a fluorinated organic material so that in the final arrangement the resulting compound will be found attached to the fiber in such manner that the fluorinated terminal groups are oriented away from the fiber and toward the asphalt or wax or other laminant which may be subsequently applied to the fibers.

At this time we are not prepared to set forth with too great a degree of assurance the precise chemical and physical principles which are involved in the obtaining of the desired results, although we believe that the principal factor involved is the ability to retain the contact angle, and it may be that the character and arrangement of the molecules of the film of the compound formed by polymerization of the ingredients in the treatment liquid, and the arrangement or orientation of these molecules on the fibers are of importance.

In any event, we know that the process will work successfully with ordinary kraft papers of weights between 30 pounds and 50 pounds per ream of 3,000 square feet and calendered to a thickness of between 0.003 inch and 0.005 inch.

On the accompanying drawing Figure 1 is a diagram or flow sheet of our process as used in making a laminated sheet, and Fig. 2 is an enlarged cross-section of a finished laminated sheet made by said process.

*Example*

In actual practice, we have obtained the most success with a conditioning agent of the class generally disclosed in Reid United States Patent No. 2,662,835, which deals with chromium coordination complexes formed by reacting chromyl-chloride with saturated perfluoromonocarboxylic acids having from 4 to 10 carbon atoms in the molecule in an inert anhydrous or solvent vehicle and in the presence of an alcohol reducing agent or a hydrolyzed ammoniated derivative thereof. These products can be obtained from Minnesota Mining and Manufacturing Company of St. Paul, Minnesota. Although other species of these products set forth in the Reid patent may be used, the one which at present seems to be best suited for all of the requirements is the product sold by that company under the name FC-804, and which is a chromium salt of a fatty acid in which some of the hydrogen has been replaced with fluorine.

It will be understood that this invention contemplates the use of any conditioning agent which will retain the contact angle as hereinbefore specified.

The FC-804 conditioning material is purchased in the form of a propyl alcohol solution containing about 30 percent of active material. This solution can be diluted with water down to any concentration which is appropriate for the particular case at hand. Concentrations of between 0.2 percent and 10.0 percent can be used.

In applying the invention to the manufacture of a laminated paper composed of two 50-pound kraft sheets each of 0.005 caliper and laminated with asphalt, we employed an aqueous solution of FC-804 containing 1.35 percent of the active material. After fully impregnating both sides of the sheet 10 with the solution 11 the impregnated sheet weighed 100 pounds per ream so that the weight of solution picked up by the sheet was equal to the weight of the sheet itself. The wet sheet was then run through the driers. Speeds of 600 to 1000 feet per minute can be used but we prefer a speed of 600 feet per minute when using a stack of fifteen 5-foot driers. After leaving the driers the sheet contained about 6 percent of water on the dry basis, and the weight of the sheet on the dry basis due to the FC-804 material contained in the solution increased by about ½ pound per ream. The driers were heated by steam to a temperature of 240° F.

Runs at different speeds and at different temperatures of drying indicated to us that better results in respect of the oleophobic characteristics of the finished paper were obtained when running at lower speeds so that the drying was carried on at a somewhat less drastic or milder rate than when running the paper at a higher speed through the same drier stack but heated to a higher temperature.

The fully conditioned face sheet 14 was then laminated by conventional apparatus 15 to another kraft sheet 16 with asphalt 17 of the normal grade used in laminated kraft paper and in the normal amounts employed for that purpose. In laminating these two sheets together we used 60 pounds of asphalt per ream of the laminated product. The asphalt had a softening point of 165 degrees, and the temperature of the fluid asphalt when applied to the sheet was 350 degrees F. When laminating the sheets together, the asphalt was heated to a somewhat higher temperature than would be used in laminating ordinary kraft sheets with asphalt, but still there was no indication of any "strike through" on the face of the finished sheet 18.

The contact angle of the face sheet did not substantially change when either asphalt or microcrystalline wax was used. In the following table, the change in contact angle with time is illustrated for an untreated and a treated sheet:

| Time [1] | Contact Angle, Asphalt | | Contact Angle, Wax (M. P. 165° F.) | |
|---|---|---|---|---|
| | Untreated, degrees | Treated, degrees | Untreated, degrees | Treated, degrees |
| 2 min | 92 | 95 | 3 | 91 |
| 10 min | 42 | 98 | 0 | 89 |
| 30 min | 24 | 95 | 0 | 80 |

[1] In oven at 220° F.

In spite of the fact that asphaltic laminating or adhesive material was applied so as to form a coating interposed between, and in direct contact with, the treated surface of the conditioned face, and although it might be expected that if the surface of the paper was thus rendered oleophobic the adhesion of the face sheet might be poor, actually the adhesion was found to be not significantly impaired by the change in character of the surface of the paper. This result was quite unexpected and just why the adhesion between the plies was thus maintained we are not now prepared to explain, but only to suggest that this anchoring function of the surface-active film applied to the fibers by our treatment results from the peculiar characteristics of the molecules of the compound and their arrangement and orientation on the surfaces of the fibers.

Another kraft sheet having a weight of 32.8 pounds per ream and a caliper of 0.003 was treated with a solution containing .35 percent of the conditioning agent. This sheet was impregnated and laminated in the manner described in the previous example. The contact angle was substantially retained with both asphalt and microcrystalline wax. The table below illustrates this:

| Time | Contact Angle, Asphalt, degrees | Contact Angle, Microcrystalline Wax, degrees |
|---|---|---|
| 2 min | 102 | 77 |
| 10 min | 86 | 72 |
| 30 min | 74 | 43 |

The foregoing examples describe the use of our invention in the production of laminated paper having our special treatment on one side of the laminated product, i. e. the face sheet, the sheet which is normally presented to view in actual service. Obviously, by treating or conditioning the sheet 16 in the same manner as the sheet 10 is treated, both sheets which are to be laminated will be conditioned on each side of the laminated product and each side will be free from "strike through." Generally it is advisable to condition both sheets in order to produce a laminated product which is free from "strike through" on both of its outer faces.

The conditioning treatment above described also may be used in the production of sheets which are not laminated to another sheet or sheets but are sold as single sheets coated with a thermoplastic material, for use as wrapping material for food products, such as meats, which carry oil or fat-like substances. Locker paper is one example of such a wrapping paper which may be made in accordance with our invention. In making such a paper, the paper is first fully conditioned in the manner described and then one face of it is coated with the desired water-resistant substance. For example, microcrystalline or other wax used for food wrappers can be applied to one side of a fully conditioned sheet in the form of a coating of the desired thickness, preferably as a continuous film, by means of conventional coating apparatus.

The various features of the invention which are believed to be new are set forth in the following claims.

We claim:

1. A paper product resistant to bleeding through of oil-soluble thermoplastic coatings which includes a sheet of cellulosic paper impregnated with an oleophobic and hydrophobic conditioning agent, and a coating of oil soluble, water insoluble thermoplastic material on the conditioned sheet, said paper having a basis weight between 15 and 90 pounds per ream of 3000 square feet, said conditioning agent being a chromium coordination complex of the saturated perfluoromonocarboxylic acids having from 4 to 10 carbon atoms in the molecule, said conditioning agent being present in an amount such that the initial contact angle of oil soluble, water insoluble thermoplastic material exceeds 60 degrees and does not change substantially in the time between 2 minutes and 5 minutes in an oven at 220° F., the amount of said conditioning agent also being such that the porosity of the sheet is not substantially impaired.

2. A paper product resistant to bleeding through of oil-soluble thermoplastic coatings which includes a sheet of cellulosic paper impregnated with an oleophobic and hydrophobic conditioning agent, and a coating of oil soluble, water insoluble thermoplastic material on the conditioned sheet, said paper having a basis weight between 15 and 90 pounds per ream of 3000 square feet, said conditioning agent being a chromium coordination complex of the saturated perfluoromonocarboxylic acids having from 4 to 10 carbon atoms in the molecule, said conditioning agent being present in an amount of between .2 percent and 10.0 percent of the weight of the sheet, said amount being such that the initial contact angle of oil soluble, water insoluble thermoplastic material exceeds 60 degrees and does not change substantially in the time between 2 minutes and 5 minutes in an oven at 220° F., the amount of said conditioning agent also being such that the porosity of the sheet is not substantially impaired.

3. The method of making a flexible, porous, moisture-resistant coated cellulosic sheet which is resistant to bleeding through of oil-soluble, adhesive thermoplastic coatings, said method including the steps of impregnating at least one face of a substantially dry, porous, flexible cellulosic sheet with a sufficient volume of a liquid to penetrate into the body of said sheet, said liquid having dispersed therein sufficient material which is capable of being set by heat to form an oleophobic and hydrophobic chromium coordination complex of perfluoromonocarboxylic acids having 4 to 10 carbon atoms to provide each sheet with an amount of said chromium coordination complex such that said sheet will maintain a substantially constant contact angle of more than 60 degrees with an oil-soluble, water-insoluble, adhesive thermoplastic coating subsequently applied to said sheet, when said sheet is tested at a temperature of 220° F. over a period of from 2 to 10 minutes, drying said impregnated sheet by heat to provide said chromium coordination complex, and then coating at least one face of said sheet with an oil-soluble, water-insoluble adhesive thermoplastic which is solid above about 65° F., whereby a moisture-resistant coated cellulosic sheet resistant to bleeding through of said coating and with substantially unimpaired porosity and flexibility is obtained.

4. The method of making a flexible, porous, moisture-resistant, coated cellulosic sheet which is resistant to bleeding through of oil-soluble, adhesive thermoplastic coatings, said method including the steps of impregnating at least one face of a substantially dry, porous, flexible cellulosic sheet having a basis weight of between 15 and 90 pounds per ream of 3000 square feet with a sufficient volume of a liquid to penetrate into the body of said sheet, said liquid having dispersed therein sufficient material which is capable of being set by heat to form an oleophobic, hydrophobic chromium coordination complex of perfluoromonocarboxylic acids having 4 to 10 carbon atoms to provide an amount of said chromium coordination complex between .2 percent and 10.0 percent, by weight of said sheet, so that said sheet maintains a substantially constant contact angle, in excess of 60 degrees, with oil-soluble, water-insoluble, adhesive thermoplastic coating subsequently applied to said sheet, when said sheet is tested at a temperature of 220° F. over a period of from 2 to 10 minutes, drying said impregnated sheet by heat to provide said chromium coordination complex, and then coating at least one face of said sheet with an oil-soluble, water-insoluble, adhesive thermoplastic which is solid above about 65° F., whereby a moisture-resistant coated cellulosic sheet resistant to bleeding through of said coating and with substantially unimpaired flexibility and porosity is obtained.

5. The method of making a flexible, porous, moisture-resistant laminated cellulosic product which is resistant to bleeding through of oil-soluble, water-insoluble adhesive thermoplastic applied thereto, said method including the steps of impregnating at least one face of a plurality of sheets of a substantially dry, porous, flexible cellulosic material with a sufficient volume of liquid to penetrate into the body of each sheet, said liquid having dispersed therein sufficient material which is capable of being set by heat to form an oleophobic, hydrophobic chromium coordination complex of perfluoromonocarboxylic acids having 4 to 10 carbon atoms to provide each sheet with an amount of said chromium coordination complex such that said sheet will maintain a substantially constant contact angle of more than 60 degrees with an oil-soluble, water-insoluble, adhesive thermoplastic placed in contact with each sheet, when each sheet is tested at a temperature of 220° F. over a period of from 2 to 10 minutes, drying said impregnated sheets by heat to provide said chromium coordination complex, and laminating said impregnated sheets together with an oil-soluble, water-insoluble adhesive thermoplastic which is solid above about 65° F., whereby a moisture-resistant, laminated cellulosic sheet product resistant to bleeding through of said thermoplastic and with substantially unimpaired porosity and flexibility is obtained.

6. The method of making a flexible, porous, moisture-resistant, laminated kraft paper which is resistant to bleeding through of oil-soluble, water-insoluble adhesive thermoplastic applied thereto, said method including the steps of impregnating a plurality of sheets of substantially dry, porous, flexible, kraft paper with a sufficient volume of liquid to penetrate into the body of each sheet, said liquid having dispersed therein sufficient material which is capable of being set by heat to form an oleophobic, hydrophobic chromium coordination complex of perfluoromonocarboxylic acids having 4 to 10 carbon atoms to provide each sheet with between .2 percent and 10.0 percent, by weight of said sheet, of said chromium coordination complex so that each sheet will maintain a substantially constant contact angle in excess of 60 degrees with an oil-soluble, water-insoluble adhesive thermoplastic placed in contact with each sheet, when each sheet is tested at a temperature of 220° F. over a period of from 2 to 10 minutes, drying said impregnated sheets by heat to provide said chromium coordination complex and laminating said impregnated sheets together with fluid oil-soluble, water-insoluble adhesive thermoplastic which is solid above about 65° F., whereby a moisture-resistant, laminated, kraft paper resistant to bleeding through of said thermoplastic and with substantially unimpaired flexibility and porosity is obtained.

References Cited in the file of this patent

UNITED STATES PATENTS

| | | |
|---|---|---|
| 2,273,040 | Iler | Feb. 17, 1942 |
| 2,296,712 | Grant et al. | Sept. 22, 1942 |
| 2,544,666 | Goebel et al. | Mar. 13, 1951 |
| 2,593,010 | Clarvoe | Apr. 15, 1952 |
| 2,662,835 | Reid | Dec. 15, 1953 |
| 2,714,952 | Ireton | Aug. 9, 1955 |
| 2,796,375 | Winslow | June 18, 1957 |